March 4, 1924.
A. L. BRIDGHAM
VALVE
Filed April 26, 1923
1,485,957
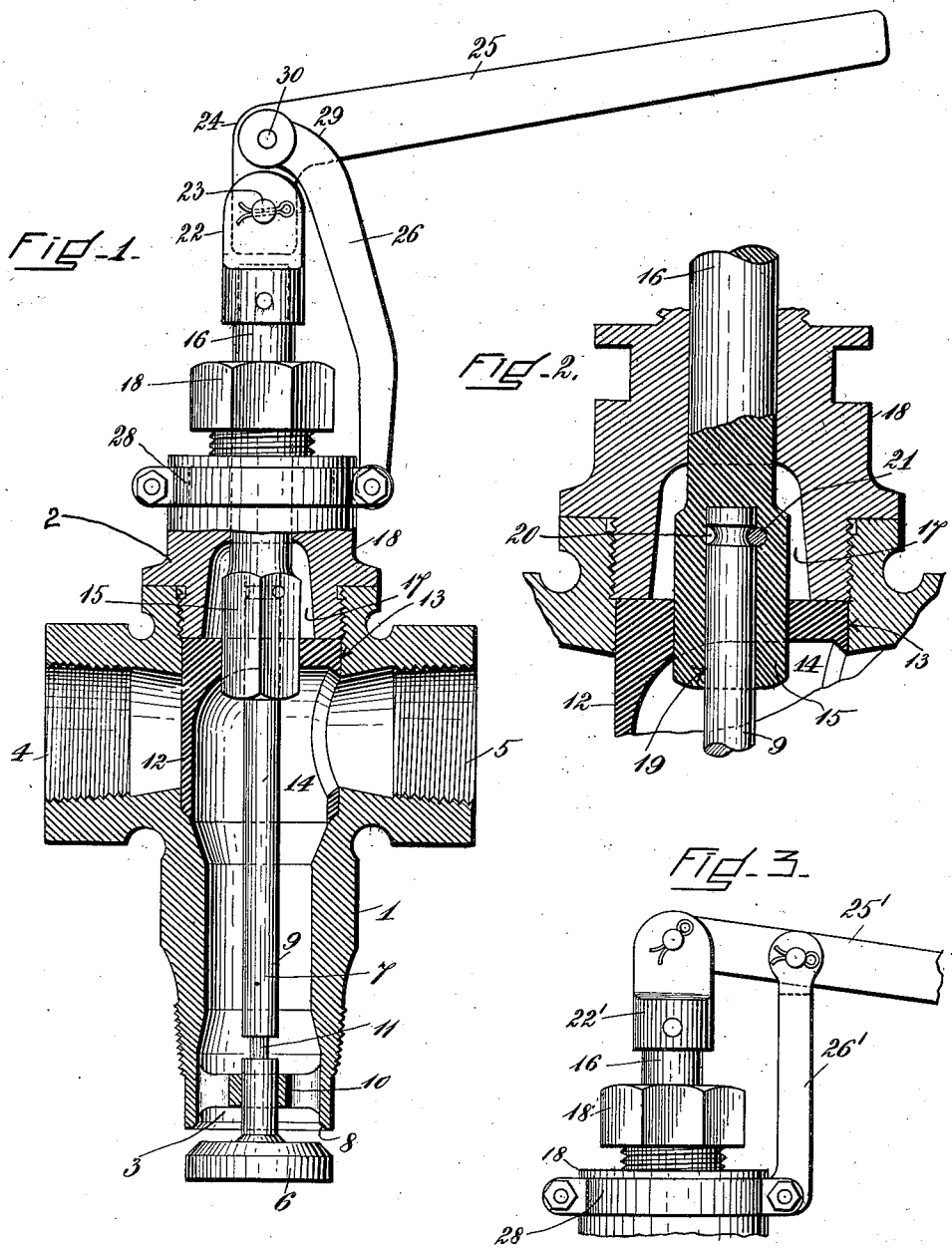
INVENTOR=
Arthur L. Bridgham
BY Coale H Hayn
ATTORNEYS Patented Mar. 4, 1924.

1,485,957

UNITED STATES PATENT OFFICE.

ARTHUR L. BRIDGHAM, OF BOSTON, MASSACHUSETTS, ASSIGNOR OF ONE-HALF TO CHARLES H. SHERBURNE, OF BOSTON, MASSACHUSETTS.

VALVE.

Application filed April 26, 1923. Serial No. 634,763.

*To all whom it may concern:*

Be it known that I, ARTHUR L. BRIDGHAM, of Boston, in the county of Suffolk and State of Massachusetts, a citizen of the United States, have invented a new and useful Improvement in Valves, of which the following is a full, clear, and exact description, reference being had to the accompanying drawings, forming a part of this specification, in explaining its nature.

The invention relates to an improvement in valves and is in part a continuation of matter disclosed in my copending application, Serial No. 441,780, filed February 2, 1921, and for which application in part the present case is substituted.

Among the objects of my invention are the following:—

To provide a valve especially adapted for controlling the passage of fluid under high pressure;

To effect a control of the pressure through a main and auxiliary valve; to arrange the main valve whereby it may control the entrance of fluid to the valve chamber and close with the pressure and be held by the pressure evenly upon its seat, obviating the tendency of the pressure to rock the valve and thereby wear it and its seat unevenly;

To provide means whereby the main valve may be operated by a manual control which permits of its maintaining only a full open or a full closed position and thereby preventing cutting of the valve seat and consequent leakage as would be the case if the valve were allowed to occupy a partially closed position;

To arrange the auxiliary valve whereby it may direct fluid entering the valve chamber through any one of a plurality of outlets and by a permitted full or partial opening control the amount of fluid allowed to pass through any one outlet;

To provide a unitary manual control for both valves; to provide a valve control by which either valve may be operated without disturbing the other valve irrespective of the open or closed position of said valve; to dispense with threads in effecting valve control especially the main valve, leaving it free to move when closed and preventing strains between it and its seat due to expansion and contraction;

To provide a valve which may be taken apart or repaired without removing it from the fixture to which it may be applied.

The valve can best be seen and understood by reference to the drawings in which it is shown in the light of a valve having a two-way outlet passage,—a construction to which it is especially adapted.

Figure 1 is a vertical section of the valve, a portion thereof being shown in side elevation.

Fig. 2 is a vertical section in enlarged detail of a portion of the valve.

Fig. 3 is a side elevation of a slightly modified lever control for operating the valve.

Referring to the drawings:—

1 represents the body of the valve and 2 the valve head or bonnet threaded to the body. The body of the valve is provided with an inlet 3 at the inner end thereof and at either side with outlets 4 and 5, respectively, the outlets being preferably oppositely arranged. The inlet end portion of the valve body is preferably externally threaded for making attachment to any chamber or fixture (not shown) which contains the fluid under pressure controlled by the valve. The outlet portions of the valve body are preferably internally threaded by which pipes or fixtures (not shown) and extending beyond the valve may be attached thereto.

6 represents the main valve and 7 the stem of this valve. The valve 6 controls the inlet 3 and is arranged beyond the inlet to close inwardly against a valve seat 8 on the inner end of the valve body, the valve closing in the direction the fluid pressure is moving as it enters the chamber 9 of the valve body.

To assist in centering the main valve and for guiding it during its operation onto and off its seat, the valve body is preferably provided with a guiding web 10 through which the stem 7 of the valve extends. Just above this web the valve stem is preferably weakened at the point 11 in order that the stem may break at this point in case of accident.

Located within the body of the valve adjacent the outlet passages is an auxiliary rotary valve 12. This valve is fitted to turn freely within a socket 13 in the valve body and is held in place by the bonnet. The auxiliary valve has a passage 14 through it.

The inlet end of this passage is in constant communication with the chamber 9 and inlet 3 thereto. The outlet end of the passage 14 is coincident with either one or the other of the outlets 4 or 5 depending upon the direction the auxiliary valve is turned. The adaptation of the auxiliary valve is also such that it may be turned either to a full open or partially open position for controlling the passage of fluid through any one outlet when the main valve is open.

The stem 7 of the main valve extends upwardly through the chamber 9 of the valve body, through the passage 14 in the auxiliary valve and connects with the squared end 15 of a stem extension 16. The squared end 15 of this extension extends through the auxiliary valve and is slidable with an endwise movement with relation thereto. Beyond its squared end the extension 15 passes through the chamber 17 of the bonnet and through and beyond a packing nut 18 with which the upper end of the bonnet is fitted.

The valve stem and its extension are together slidably movable in an endwise direction for moving the main valve onto and off its seat. The stem extension 16 is also capable of being turned in a rotary direction and is accordingly made cylindrical in cross section, excepting the lower squared end 15 thereof which engages the auxiliary valve for turning it as the stem extension is turned. The stem connection is also such that the auxiliary valve may be turned without disturbing the main valve especially when occupying a closed position. For this purpose the stem 7, made circular in cross section, fits within a socket 19 within the squared end 15 of the stem extension and is provided with an annular groove 20. Passed through the end 15 of the extension is a pin 21 which is partly contained within the groove 20, thereby fastening the stem 7 to its extension to be movable therewith in an endwise direction when force is applied to impart an endwise movement to the stem extension for controlling the main valve, but remaining immovable and the main valve with it when force is applied to the stem extension for turning it and thereby positioning the auxiliary valve.

Reference will now be made to the mechanism for applying force to the stem connection for operating the main valve and for turning and thereby positioning the auxiliary valve. This mechanism is such that the main valve will be operated to occupy either a full closed or a full open position. For this purpose the upper end of the stem extension 16 extending above the packing nut 18 is provided with a clevis 22. Pivoted to this clevis by a pin 23 is the bent end 24 of a lever 25. The lever is fulcrumed to turn on a fulcrum strap 26. The lower end 27 of this strap is pivotally secured to a rotary fulcrum ring 28 on the bonnet while the upper end 29 of the strap is bifurcated to straddle the lever, and the lever is pivoted to the ends thus provided by means of a fulcrum pin 30. By this means force may be applied upon turning the lever up or down to move the main valve onto and off its seat or turn and thereby position the auxiliary valve with relation to the outlet passage on moving the lever in a lateral direction to the right or left.

The operating mechanism is also such that the main valve will be moved to occupy either a full closed or a full open position. Closing as it does with the pressure, the tendency of the main valve will be to assume a closed position and accordingly on turning the lever for closing the main valve the action will be assisted by the pressure, the main valve when closed being held on its seat by the pressure and also by the weight of the lever arm. The arrangement of the parts is also such that when the operating arm of the lever has been lifted for opening the main valve and when this valve has reached a full open position, the fulcrum pin 31 of the lever will have been moved to a position directly over the pin 23, both pins then lying within the axis of the valve stem. Until displaced from such position no force as for example the force of pressure, applied to the main valve can close this valve and accordingly the valve will be maintained in a full open position. It will therefore be seen that inasmuch as the main valve is controlled to occupy either a full closed or a full open position, the pressure will have no effect to cut the valve seat. When it is desired to cut down the inflow from the valve, this is effected not by a partial closure of the main valve but by turning the auxiliary valve. In this way the fluid will be prevented from cutting the valve seat as might be the result if the main valve were partially closed.

In some cases it is desirable to employ a lever for operating the valves by which the main valve will be held open by the operator and automatically closed when the operator releases his hold on the lever. For example, when the valve is being used to clear the ash-pits of a locomotive the operator will open the main valve and turn the auxiliary valve to communicate with the outlets in succession without releasing his hold on the lever. If for any reason he should release his hold upon the lever the main valve will instantly close. A lever so adaptable is shown in Fig. 3 in which a lever 25' is employed the forward end of which is pivotally secured to a clevis 22' on the upper end of the stem extension 16. Back of its pivotal connection to the clevis the lever is fulcrumed to turn on a fulcrum strap 26' pivotally secured to the fulcrum ring 28 on the bonnet.

Having thus fully described my invention, I claim and desire to secure by Letters Patent of the United States:—

1. In a valvular device, a chambered body having an inlet and an outlet, an inwardly-closing main valve for controlling the inlet, an auxiliary valve socketed to turn within said body for controlling the outlet, a stem connection extending through said auxiliary valve and connecting with said main valve, said stem connection being movable endwise with relation to said auxiliary valve and being also rotative and in engagement with said auxiliary valve whereby the auxiliary valve may be rotated and positioned as said stem connection is turned, a lever connecting with said stem connection for operating it either with an endwise or a rotary movement, and a rotary mounting for said lever.

2. In a valvular device, a chambered body having an inlet and an outlet, an inwardly-closing main valve for controlling the inlet, an auxiliary valve socketed to turn within said body for controlling the outlet, a stem connection extending through said auxiliary valve and connecting with said main valve, said stem connection being movable endwise with relation to said auxiliary valve and being also rotative and in engagement with said auxiliary valve whereby the auxiliary valve may be rotated and positioned as said stem connection is turned, said stem connection being arranged also whereby the valves may be operated independently of one another and the auxiliary valve turned and positioned when the main valve is occupying a closed position without disturbing said main valve, and means for operating said stem connection with either an endwise or a rotary movement.

3. In a valvular device, a chambered body having an inlet and an outlet, an inwardly-closing main valve for controlling the inlet, an auxiliary valve socketed to turn within said body for controlling the outlet, a stem connection extending through said auxiliary valve and connecting with said main valve, said stem connection being movable endwise with relation to said auxiliary valve and being also rotative and in engagement with said auxiliary valve whereby the auxiliary valve may be rotated and positioned as said stem connection is turned, said stem connection being arranged also whereby the valves may be operated independently of one another and the auxiliary valve turned and positioned when the main valve is occupying a closed position without disturbing said main valve, a lever connecting with said stem connection for operating it either with an endwise or a rotary movement, and a rotary mounting for said lever.

4. In a valvular device, a chambered body having an inlet and an outlet, an inwardly-closing main valve for controlling the inlet, an auxiliary valve socketed to turn within said body for controlling the outlet, and means for operating said valves whereby said main valve will maintain only a full closed or a full open position and said auxiliary valve a closed or any adjusted open position.

5. In a valvular device, a chambered body having an inlet and an outlet, an inwardly-closing main valve for controlling the inlet, an auxiliary valve socketed to turn within the body for controlling the outlet, a stem connection extending through said auxiliary valve and connecting with said main valve, said stem connection being movable endwise with relation to said auxiliary valve and being also rotative and in engagement with said auxiliary valve whereby the auxiliary valve may be rotated and positioned as said stem connection is turned, and means for operating said stem connection with either an endwise or a rotary movement and whereby also said main valve will maintain only a full closed or a full open position and said auxiliary valve a closed or any adjusted open position.

6. In a valvular device, a chambered body having an inlet and an outlet, an inwardly-closing main valve for controlling the inlet, an auxiliary valve socketed to turn within the body for controlling the outlet, a stem connection extending through said auxiliary valve and connecting with said main valve, said stem connection being movable endwise with relation to said auxiliary valve and being also rotative and in engagement with said auxiliary valve whereby the auxiliary valve may be rotated and positioned as said stem connection is turned, an operating lever pivotally secured to said stem connection, a rotary fulcrum ring and a fulcrum strap interposed between said lever and ring and pivoted respectively thereto, the arrangement being such that when the main valve has been opened by the operation of the lever the pivotal connection between the lever and said stem connection and between it and said fulcrum strap will both lie within the axis of said stem connection.

ARTHUR L. BRIDGHAM.